United States Patent [19]

Moore

[11] Patent Number: 4,469,971
[45] Date of Patent: Sep. 4, 1984

[54] STATOR SLOT WEDGE ASSEMBLY WITH AXIAL SPRING RETAINER

[75] Inventor: Victor A. Moore, Peterborough, Canada

[73] Assignee: Canadian General Electric Company, Ltd., Toronto, Canada

[21] Appl. No.: 508,176

[22] Filed: Jun. 27, 1983

[30] Foreign Application Priority Data

Nov. 18, 1982 [CA] Canada .................................. 415888

[51] Int. Cl.³ .............................................. H02K 3/48
[52] U.S. Cl. ...................................... 310/214; 29/596; 310/215
[58] Field of Search .................. 310/214, 215; 29/596, 29/598

[56] References Cited

U.S. PATENT DOCUMENTS

| | | | |
|---|---|---|---|
| 2,723,358 | 11/1955 | Holmgren | 310/214 |
| 3,139,550 | 6/1964 | Geer | 310/214 |
| 3,665,576 | 5/1972 | Nordmann et al. | 29/205 |
| 3,949,255 | 4/1976 | Brown et al. | 310/214 |
| 4,015,156 | 3/1977 | Johrde | 310/214 |
| 4,149,101 | 4/1979 | Lesokhin et al. | 310/214 |
| 4,200,818 | 4/1980 | Ruffing et al. | 310/214 |
| 4,387,316 | 6/1983 | Katsekas | 310/214 |

FOREIGN PATENT DOCUMENTS 1095108  2/1981  Canada .................................. 310/214

Primary Examiner—J. D. Miller
Assistant Examiner—D. L. Rebsch
Attorney, Agent, or Firm—James W. Mitchell

[57] ABSTRACT

A stator wedge assembly provides a spring force to assist in retaining a conductor securely in a slot, without requiring a separate spring. Two ends of the assembly are received in a dove-tail at the mouth of a slot. A central spring section extends between the two ends and is slightly narrower than the walls at the mouth of the slot, so that it is free to flex. The central part of the central spring section has an increased thickness extending towards the conductor in the slot. At least one wedge is inserted, to press against the conductor in the slot on one side and to press against at least one of the two ends and the central part of the central spring section on the other side, forcing the central spring section away from the conductor. Because of the flexibility or springiness of the material of the flexed central spring section, a spring force is applied to assist in restraining the conductor in the slot.

12 Claims, 9 Drawing Figures

STATOR SLOT WEDGE ASSEMBLY WITH AXIAL SPRING RETAINER

BACKGROUND OF THE INVENTION

This invention relates to a slot wedge assembly for a dynamoelectric machine, and in particular it relates to an improved wedge assembly for retaining conductors in stator slots in a dynamoelectric machine.

In larger dynamoelectric machines there is normally a stator core formed of a stack of laminations having slots. When the laminations are assembled in a stack the individual slots are aligned to form axially extending, radial slots which have a slot opening or slot mouth at a radially inner circumference of the stator core annulus. Stator bars or conductors are installed in these slots and they must be held firmly in place against mechanical and electromagnetic forces which tend to cause movement. The slots are usually made with a dove-tail adjacent the slot mouth or slot opening, and a key or wedge assembly of mating configuration with the dove-tail is pressed into the dove-tail to close the slot. Shims and/or springs are often used between the conductors and the slot closure or wedge assembly to prevent movement of the conductors.

Conductors used in larger dynamoelectric machines usually have a jacket formed of a thermosetting resinous material impregnating a porous material and this is cured to a hard state, forming the insulating jacket around the conductor. In addition, there may be portions of the jacket coated with a partially conducting resilient elastomer to reduce the possibility of corona discharge between the conductors and the slot walls. When these conductors are first installed they are very firmly wedged into their slots and are satisfactorily restrained against movement. However, with time the possibility of decreasing restraining forces has been a problem. Repeated thermal cycling may permit some flowing of the jacket surrounding the conductors or there may be some shrinkage. In larger machines the conductors may carry large currents and the electromagnetic forces can be quite strong. These factors may aid in decreasing the restraining forces. To reduce the possibility of restraining forces decreasing unacceptably with time, it has been usual to use a spring force between the wedge assembly and the conductors.

Various configurations and arrangements have been devised to provide a spring force between the wedge assembly and the conductors. For example, it is known to use "ripple springs", that is, strips of spring metal formed with transverse ripples, placed to exert a force between the slot closure and the conductors. U.S. Pat. No. 3,909,931 - LAMBRECHT, issued Oct. 7, 1975 and No. 3,949,255 - BROWN and HAWLEY, issued Apr. 6, 1976, are examples of arrangements using this form of spring.

Another arrangement to provide a spring force between slot closure or wedge assembly and conductor is described in Canadian Pat. No. 1,095,108 - FERGUSON, issued Feb. 3, 1981. In this arrangement the spring extends along the slot with a curvature that is transversely oriented with respect to slot length so that it exerts its force along the length of the slot rather than across it. This spring is preferably made of layers of glass cloth impregnated with a curved thermosetting polyester resin.

The known spring arrangements, while they maintain a restraining force over an increased period of time, require a separate spring in the wedge assembly. The installation and maintenance would be easier if the separate spring could be eliminated while the spring force is retained.

OBJECTS OF THE INVENTION

It is therefore an object of the invention to provide a slot wedge assembly which gives a spring force without using a separate spring.

It is a further object of the invention to provide a slot wedge assembly which is easy to install and which provides a spring force between the assembly and the conductors in the respective slot.

SUMMARY OF THE INVENTION

Accordingly there is provided a wedge assembly for a dynamoelectric machine having a stack of laminations in which conductor-receiving slots are provided extending axially of said machine, each slot having a dove-tail configuration adjacent the slot opening, comprising a pair of ends having complementary surfaces to said dove-tail configuration for insertion into the dove-tail configuration across said slot opening, with said complementary surfaces engaging dove-tail surfaces, a central spring section extending between said pair of ends and being restrained from flexing action at said ends, said central spring section having a width less than the width of said slot opening, and having a central part of greater thickness than the ends thereof, and wedge means for insertion beneath at least said central part for engaging said central part and flexing said central spring section outwardly to provide an inwardly directed spring force.

BRIEF DESCRIPTION OF THE DRAWINGS

The invention will be described with reference to the accompanying drawings, in which.

DETAILED DESCRIPTION OF THE INVENTION

Figure 1:
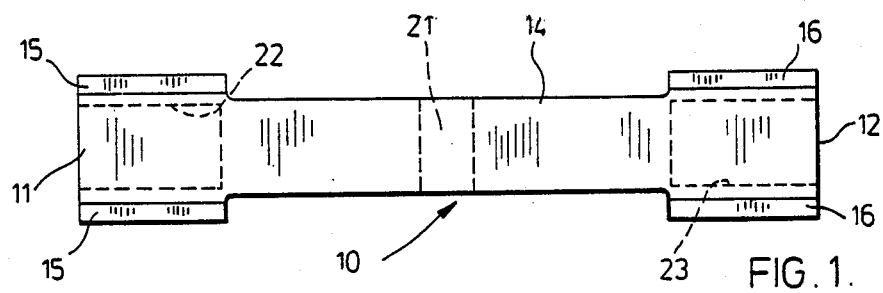
FIG. 1 is a plan view of a slot closure or slot key portion of a wedge assembly according to one form of the invention.

Referring to FIG. 1, there is shown a plan view of a key or slot closure 10. The slot closure 10 has a pair of ends 11 and 12 and a central spring section 14. The ends 11 and 12 have sloping surfaces 15 and 16 for mating with corresponding surfaces in the dove-tail at the mouth of a slot. If the ends 11 and 12 were extended until they joined (and there was no central section 14), then the result would be one form of prior art slot closure. However, the central spring section 14 is narrower than the slot opening and consequently has no engagement with the sides of the slot mouth or the dove-tails. The central section 14 is therefore free to flex, and it is made of a material which provides for limited bending or flexing, such as, for example, layers of glass cloth impregnated with a thermosetting resin.

Figure 2:
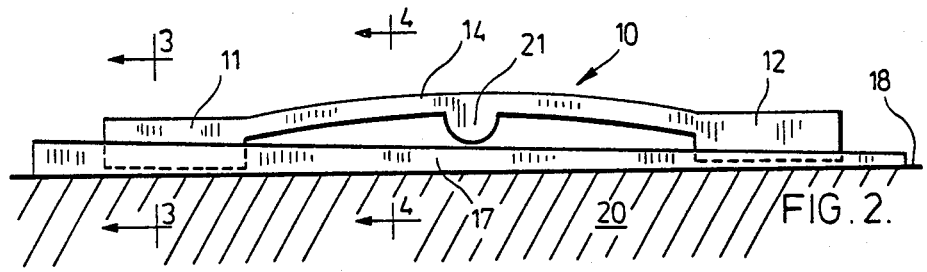
FIG. 2 is a side view of a wedge assembly with the slot closure or key of FIG. 1.

Referring to FIG. 2, the slot closure 10 is shown in a side view as it would appear when mounted in a slot. The ends 11 and 12 are engaged with the dove-tail at the mouth of the slot, and a wedge 17 is forced beneath slot closure 10, that is, between the ends 11 and 12 and the outer surface 18 of a conductor 20 in the slot. A curved projection 21, centrally located on spring section 14, is forced outwards by wedge 17, causing flexing of spring section 14. The degree of flexing may be somewhat exaggerated in FIG. 2 for purposes of illustration. The end pieces 11 and 12 have channels 22 and 23, respectively, to receive and guide wedge 17. These channels 22 and 23 have different depths, to correspond to the slope of the wedge. The channel 22 is perhaps best seen in FIG. 3.

Figure 3:
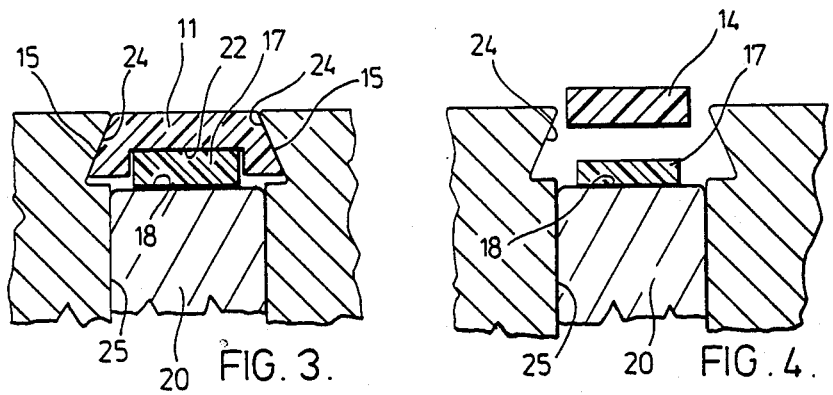
FIG. 3 is a partial sectional view taken along lines 3—3 of FIG. 2.

Referring to FIG. 3, which is a cross-sectional view through end 11 as indicated by line 3—3 of FIG. 2, the wedge 17 is shown in place in channel 22 of end 11. The sloping surfaces 15 of end piece 11 are shown in engagement with the mating edges 24 of the dove-tail at the mouth of slot 25 which contains conductor 20.

Figure 4:
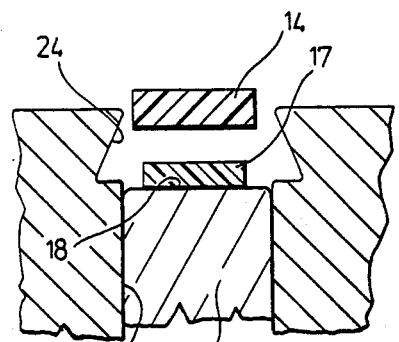
FIG. 4 is a partial sectional view taken along line 4—4 of FIG. 2.

Referring to FIG. 4, which is a cross-sectional view taken along line 4—4 of FIG. 2, the central spring section 14 is shown as flexed away from wedge 17. The flexing provides the spring force which presses against the wedge 17 to retain conductor 20 in the slot 25.

While FIGS. 2-4 show a wedge assembly using a single wedge 17, it will be apparent that the assembly could be adapted to the use of two wedges, that is, two wedges with complementary slopes.

Figure 5:
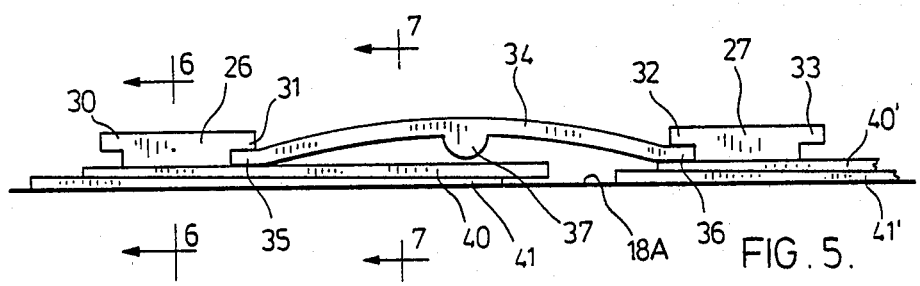
FIG. 5 is a side view of another form of wedge assembly according to the invention.
Figure 6:
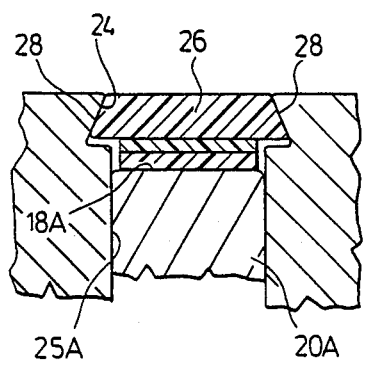
FIG. 6 is a partial sectional view taken along line 6—6 of FIG. 5.
Figure 7:
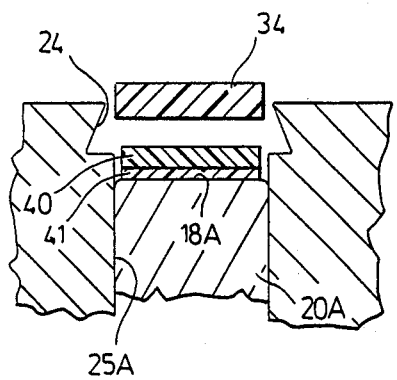
FIG. 7 is a partial sectional view taken along line 7—7 of FIG. 5.

Referring now to FIGS. 5-7, there is shown another form of the invention which uses pairs of wedges and which, in effect, separates the end pieces and the central spring section. FIG. 5 is a side view of an installed wedge assembly with FIGS. 6 and 7 being sectional views taken along lines 6—6 and 7—7 of FIG. 5, respectively. A pin end 26 and 27 have sloping edges on their sides for mating with or engaging with the sloping surfaces of the dove-tail. The sloping edges 28 of pin end 26 are shown in FIG. 6. The pin end 26 has lips 30 and 31 and the pin end 27 has lips 32 and 33. The lips project in the direction of the slot, that is, in an axial direction. A central spring section 34 of stiff, flexible material provides a limited bending or flexing. The spring section 34 has a width slightly narrower than the width of the slot, so it is free to flex. The central spring section 34 has end portions 35 and 36 which fit beneath lips 31 and 32 of pin ends 26 and 27, respectively. A curved projection 27 extends across spring section 34 midway of the end portions 35 and 36 and engages the outer surface of the outer wedge 40 of a pair of wedges 40 and 41. The wedges 40 and 41 have complementary slopes for maintaining outer surfaces that are substantially parallel.

It will be seen, particularly from FIGS. 6 and 7, that when the wedge assembly is installed in slot 25A, the wedges 40 and 41 tapped into position to hold pin end 26 firmly in position (a similar pair of wedges 40' and 41' hold pin end 27 in position), the projection 37 engages the outer surface of wedge 40 and causes central spring section to deflect outwards as shown. Because of the spring action provided by spring section 34, a force is provided between the spring section 34 and the surface 18A of conductor 20A.

While the wedge assembly of FIGS. 5-7 comprises two pin ends and a central spring section it is, in fact, a two piece slot closure arrangement (except for the end assembly) as one of the pin ends serves to receive the next central spring section.

Figure 8:
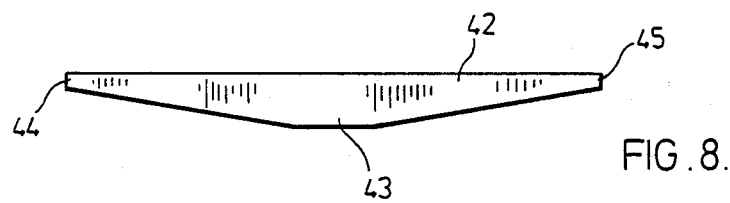
FIG. 8 is a side view of a tapered central spring section according to another form of the invention.
Figure 9:
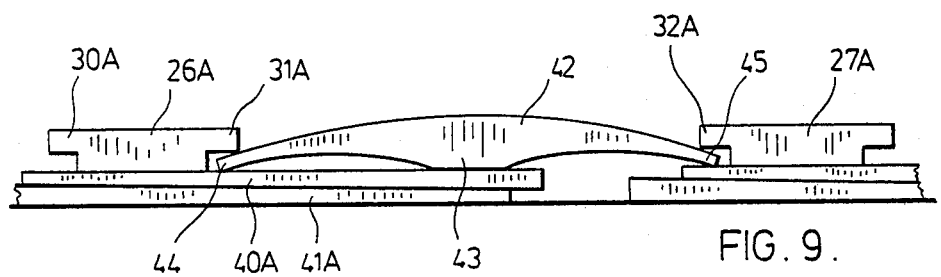
FIG. 9 is a side view of a wedge assembly using the spring section of FIG. 8.

Referring now to FIGS. 8 and 9, there is shown another form of the invention that is a variation of the form shown in FIGS. 5-7. FIG. 8 shows a tapered central spring section 42. The spring action is improved by reducing the thickness from the middle region 43 towards each end portion 44 and 45. The thickness of the middle region 43 is preferably sufficient that no projection (i.e. a projection similar to projection 37 of FIG. 5) is required. The taper need not, of course, be linear as shown.

In FIG. 9 the wedge assembly is shown in its installed position. Two pin ends 26A and 27A are installed in a slot in a manner similar to that of FIGS. 5-7. The central spring section 42 has an end portion 44 engaged under lip 31A of pin end 26A, and an end portion 45 engaged under lip 32A of pin end 27A. As before, a pair of wedges 40A and 41A press the middle region 43 outwards and the spring action of central spring section 42 provides the restraining force. Again, the curvature of section 42 in its installed position may be somewhat exaggerated for ease of illustration.

It will be apparent that in all forms of the invention, the size of the projections 21 and 37 (FIGS. 2 and 5) and the thickness of the middle region 43 (FIGS. 8 and 9), must be selected with the flexibility or springiness of the respective central spring sections 14, 34 and 42, to provide the required initial and residual spring force. If, with time, a small amount of shrinkage or flowing of material in the slot should occur, or a tendency to loosen the fit for any other reason should occur, there will remain a residual restraining force resulting from the spring action of the central section for satisfactorily retaining the conductors. The residual force is limited, of course, by the capability of the spring section.

The installation of the wedge assembly according to the invention is straight forward. No separate spring is required beneath the slot closure or key that fits the dove-tail. The spring action is obtained from part of the slot closure itself, that is, from the central section of the wedge assembly.

While there is shown what is considered, at present, to be the preferred embodiments of the invention, it is, of course, understood that various modifications may be made therein with respect to details of the invention. It is intended to cover all modifications as fall within the true spirit and scope of the invention.

What is claimed is:

1. A wedge assembly for a dynamoelectric machine having a stator core comprising a stack of laminations in which radial conductor-receiving slots are provided extending axially of said machine, each slot having a dove-tail configuration adjacent the slot opening, comprising:

a pair of ends having complementary surfaces to said dove-tail configuration for insertion into the dove-tail configuration across said slot opening with said complementary surfaces engaging dove-tail surfaces, a central spring section extending between said pair of ends and being restrained from flexing action at said ends, said central spring section having a width less than the width of said slot opening, and having a central part of greater thickness than the ends thereof, and, wedge means for insertion beneath at least said central part for engaging said central part and flexing said central spring section outwardly to provide an inwardly directed spring force.

2. A wedge assembly as defined in claim 1 in which said pair of ends and said central spring section are unitary.

3. A wedge assembly as defined in claim 2 in which said wedge means is a single wedge.

4. A wedge assembly as defined in claim 3 in which at least one of said ends includes a channel on its inward side for receiving said wedge.

5. A wedge assembly as defined in claim 3 in which each end has an axially extending channel on its inward side for receiving said wedge, the depth of the channel in each end being related to the thickness of the wedge at respective points on the wedge spaced apart by the spacing of said ends.

6. A wedge assembly as defined in claim 1 in which each end is a pin end having lips projecting in an axial direction, and in which said central spring section has ends for insertion beneath a respective lip of a respective pin end whereby said ends are retained beneath the respective lip.

7. A wedge assembly as defined in claim 1, 5 or 6 in which said cental part of greater thickness than the ends thereof comprises a curved projection extending across the width of said central spring section on the side adjacent said wedge means.

8. A wedge assembly as defined in claim 1, 5 or 6 in which said central part of greater thickness than the ends thereof comprises a central part tapering to each end, the taper being on the side of said central spring section adjacent said wedge means.

9. A wedge assembly system for a dynamoelectric machine of the type having a stator core formed of a stack of laminations with spaced radial slots extending along the axial length of said core, said slots having openings at an inner circumference of the core annulus, and conductors disposed in said slots, each said slot having a dove-tail configuration adjacent said opening of said slot said assembly system comprising:

a plurality of pin ends spaced apart axially along the length of said slots, said pin ends having sloping sides complementary to said dove-tail configuration engaging the respective mating surfaces of said dove-tail configuration, said pin ends having axially projecting lips, a plurality of central spring sections each having opposite ends for placement beneath a lip of a respective pin end, said central spring section having a width less than the width of a slot, and a central part having a thickness greater than the thickness of the end parts, and, a pair of wedges having complementary slopes for insertion between the conductor in a respective slot and both the center part of the central spring section and at least one of the adjacent pin ends to press the center part of said central spring section outwards providing an inwardly directed spring face to said respective conductor.

10. A wedge assembly system as defined in claim 9 in which said central part of said central spring section is a projection extending across the width of said central spring section and directed inwardly towards said conductor.

11. A wedge assembly system as defined in claim 9 in which said central part of said central spring section comprises a thick section tapering towards each end part, the taper being on the inward face of said central spring section towards said conductor.

12. A method of retaining conductors in a conductor slot of a dynamoelectric machine comprising:

inserting the conductors into the conductor slot, sliding ends of wedge assembly into dove-tail grooves in the slot wall adjacent the slot opening, inserting ends of a central spring section beneath lips of respective adjacent spaced ends, inserting a pair of wedges between a conductor and both an end and an inwardly directed central projection part of said central spring section, and driving the wedges together to press said projection and the central part of said central spring section outwardly to cause said central spring section to provide a force to said conductor.

* * * * *